United States Patent [19]

Hendrych

[11] Patent Number: 4,824,163
[45] Date of Patent: Apr. 25, 1989

[54] CONVERTIBLE COVER

[76] Inventor: Jaroslav Hendrych, 4530 Boul. des Sources, Apt. 120, D.D.O., Quebec, Canada

[21] Appl. No.: 168,484
[22] Filed: Mar. 15, 1988
[51] Int. Cl.$^4$ .................................................. B60P 7/02
[52] U.S. Cl. ...................................... 296/100; 296/10; 108/44; 108/34
[58] Field of Search .................... 296/22, 10, 24 A, 26, 296/27, 100, 156, 165, 168, 173, 164; 108/13, 33, 34, 38, 44; 312/277

[56] References Cited

U.S. PATENT DOCUMENTS

| 3,738,699 | 6/1973 | Fain | 296/168 |
| 3,741,606 | 6/1973 | Grier | 296/22 |
| 3,765,717 | 10/1973 | Garvert | 296/100 |
| 3,981,529 | 9/1976 | Bontrager | 296/173 |
| 4,142,760 | 3/1979 | Dockery et al. | 296/100 |
| 4,187,636 | 2/1980 | Pauly | 296/173 X |
| 4,372,568 | 2/1983 | Campbell | 296/173 X |

Primary Examiner—Robert B. Reeves
Assistant Examiner—John M. Gruber

[57] ABSTRACT

A convertible cover for an open-top vehicle box such as a trailer or the box of a pick-up truck. The cover is removably secured to the box and has a top wall with at least one opening therein spaced from an edge of the top wall to form a seat section on the top wall intermediate the opening and an adjacent side edge of the top wall. A flat removable panel is secured in close fit on the top wall and overlies at least the opening. The panel is supportable elevated from the top wall to constitute a table top.

15 Claims, 3 Drawing Sheets

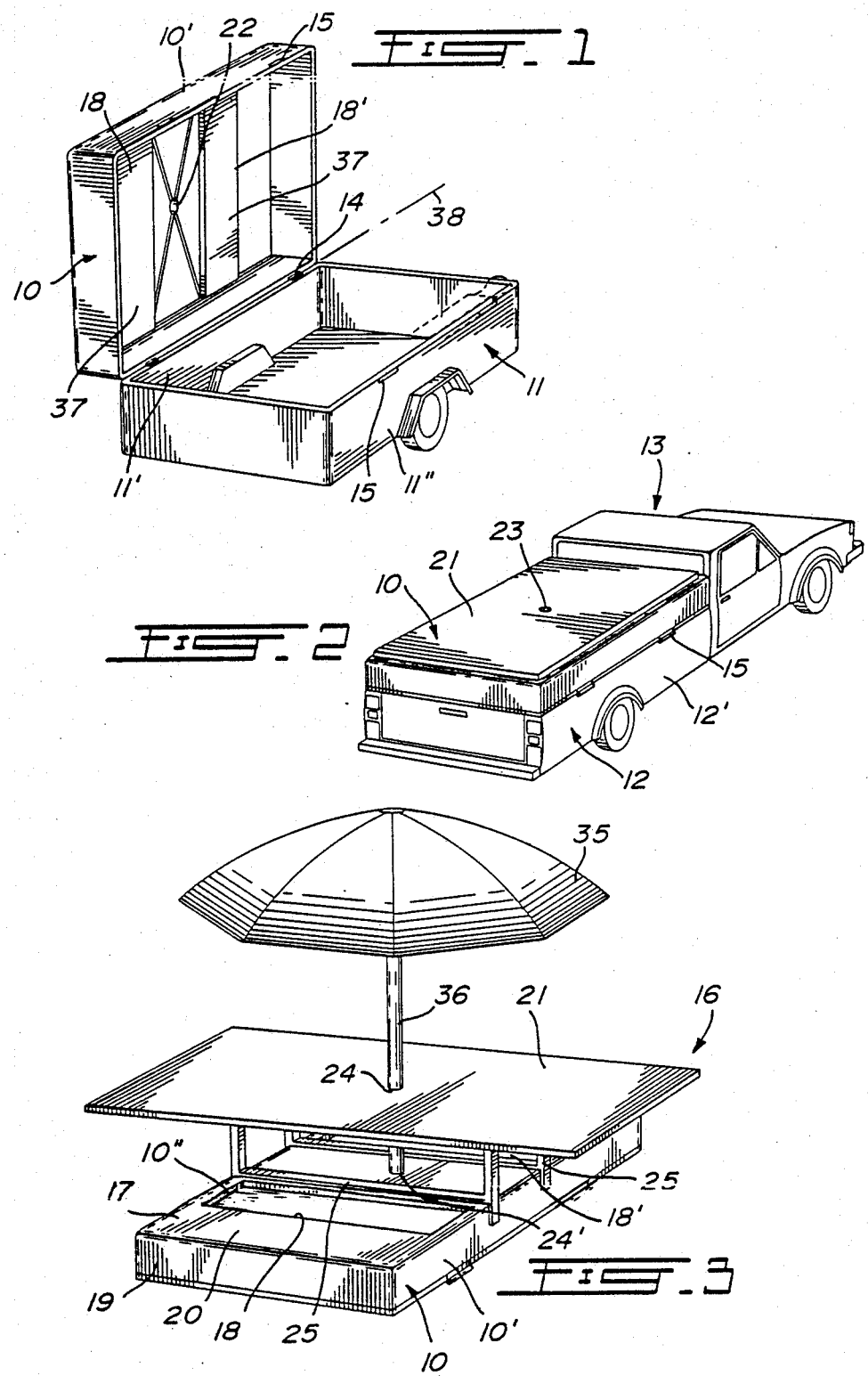

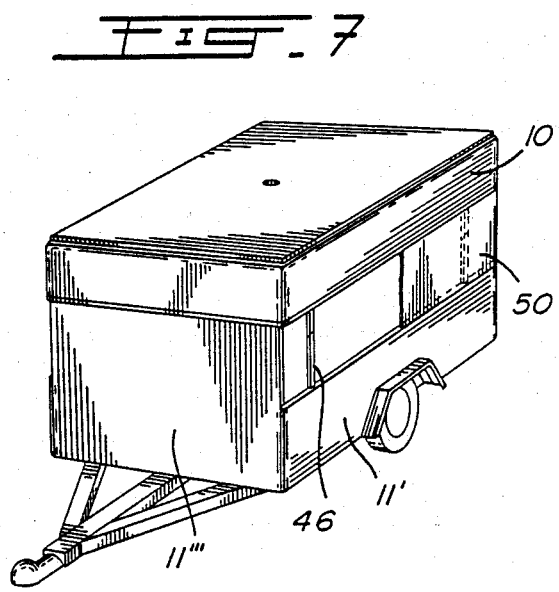
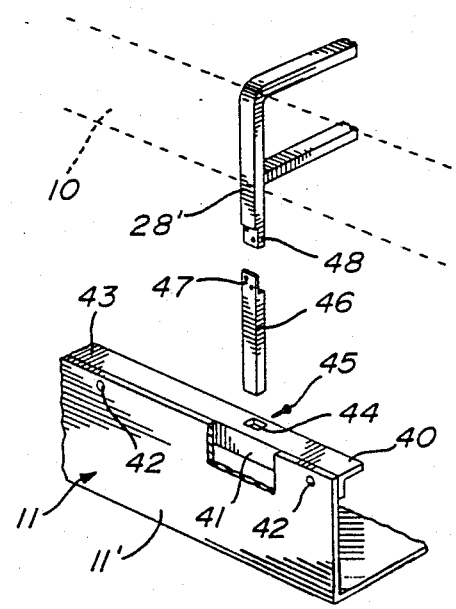

CONVERTIBLE COVER

BACKGROUND OF INVENTION

1. Field of the Invention

The present invention relates to a convertible cover which is removably securable to an open-top vehicle box, such as a trailer or the box of a panel truck and wherein the cover is provided with at least one hole therein to define a seat section and is further provided with a removable panel to cover at least the hole and supportable elevated from the top wall of the cover to constitute a table top.

2. Description of Prior Art

It is known in the art to convert open-top box trailers or vehicle boxes to form an enclosure which acts as sleeping quarters or the like. Various other type accessories are provided with such trailers to convert them for a multitude of uses.

SUMMARY OF INVENTION

It is a feature of the present invention to provide a novel convertible cover which is detachably securable to an open-top vehicle box, such as a trailer or a panel truck box and wherein the cover is convertible to form a picnic-like table with seats and a table top.

According to the above feature, from a broad aspect, the present invention provides a convertible cover for an open-top vehicle box. The cover is provided with attachment means for detachably securing same to the box. The cover also has a top wall with at least one opening therein spaced from an edge of the top wall to form a seat section on the top wall intermediate the opening and an adjacent side edge of the top wall. A flat removable panel is secured in close fit on the top wall and overlies at least the opening and is detachable to be supported to constitute a table top.

According to a further broad aspect of the present invention, there is further provided support means for supporting the panel elevated from the top wall with the panel constituting a table top supported at a predetermined orientation with respect to the opening.

According to a further broad aspect, in a preferred embodiment, there is provided two openings on the top wall of the cover and opposed to one another with the panel being supported elevated therebetween.

BRIEF DESCRIPTION OF DRAWINGS

A preferred embodiment of the present invention will now be described with reference to the examples thereof as illustrated in the accompanying drawings, in which:

FIG. 1 is a perspective view showing the convertible cover as secured to a trailer;

FIG. 2 is a perspective view showing the convertible cover secured to an open top box of a panel truck;

FIG. 3 is a perspective view showing the convertible cover used in its intended form as a picnic table;

FIG. 7 is a perspective view showing a variant wherein the framework is utilized to support the cover elevated from the open top trailer; and FIG. 8 is a perspective fragmented view showing a modification of the framework and the manner in which it is secured to the open-top trailer side wall.

Figure 4:
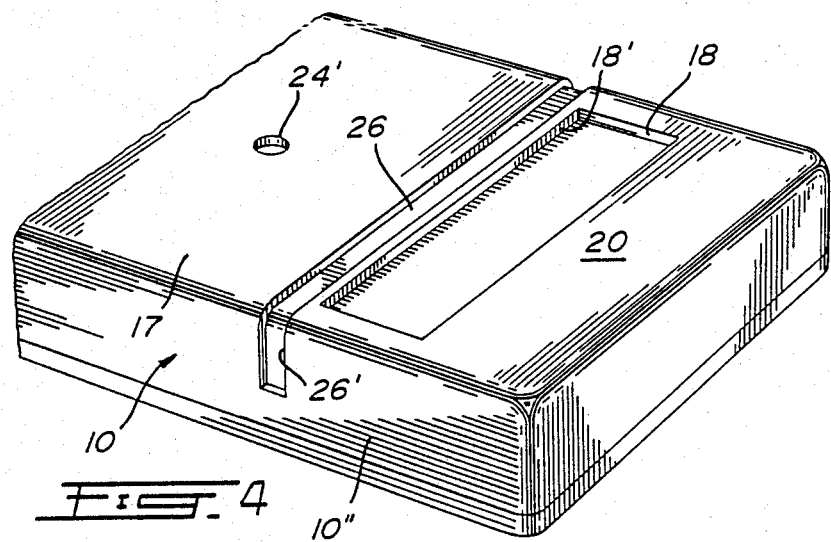
FIG. 4 is a fragmented perspective view of an end section of the cover.

DESCRIPTION OF PREFERRED EMBODIMENTS:

Referring now to the drawings, and more particularly to FIGS. 1 and 2, there is shown generally at 10, the convertible cover of the present invention as secured to an open-top vehicle trailer 11 (see FIG. 1) or an open-top box 12 of a panel truck vehicle 13 (see FIG. 2). The convertible cover 10 is provided with attachment means in the form of hinges 14 which are securable to a side wall 11' or 12' of the trailer 11 or vehicle box 12. Latches 15 are provided on the opposed side wall 11" of the trailer and the adjacent lower edge of the side wall 10' of the cover for securing the cover over the open-top end trailer 11. The hinges 14 are also provided with removable pins, as is obvious in the art, whereby the entire cover 10 can be easily removed from the trailer or pick-up truck box 12 whereby to constitute a picnic-like table arrangement as illustrated at 16 in FIG. 3.

Referring now additionally to FIG. 3, it can be seen that the top wall 17 of the vehicle box 10 is provided with at least one opening 18; as herein shown, there are two openings 18 and 18' which are of elongated rectangular shape and disposed transversely across the opposed side walls 10' and 10" of the cover and spaced from opposed end walls 19 to constitute a seat section 20 intermediate the opening 18 and the end wall 19 at opposed ends of the cover when the cover is disposed on a ground surface. A flat removable panel 21 covers at least the opening or openings 18 and 18' and is secured over the top wall 20 by means of a washer and wing nut 22 (see FIG. 1) and bolt 23 which extends through a central hole 24 and 24' (see FIG. 4) in the panel top wall 17. Accordingly, these holes 18 and 18' are sealingly covered when the cover is not in use as a picnic table.

Figure 5:
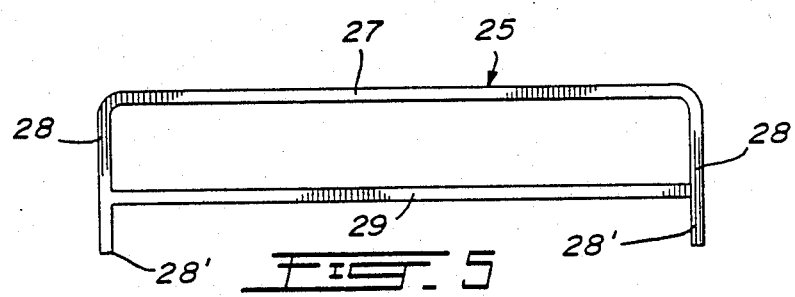
FIG. 5 is a side view of the support framework for supporting the table top elevated from the top wall of the cover.

In order to convert the cover to a picnic table, it is necessary to remove the flat removable panel 21 and support it elevated and at a predetermined orientation with respect to the openings and this is achieved by providing support means in the form of a framework 25 as better illustrated in FIG. 5. There are two such support frameworks 25 which are detachable securable to the cover top wall 17.

Referring additionally to FIGS. 4 and 5, it can be seen that in the cover top wall 17, there is provided an elongated cavity 26 extending adjacent an inner edge 18' of the openings 28 and extending a predetermined distance in the top portion of the side walls 10' and 10" of the cover whereby to receive the support framework 25 in close fit therein. This framework 25 is therefore detachably securable to the cover top wall for supportingly engaging the panel 21 elevated substantially parallel to the top wall 17 and at table height with respect to the seat portions 20. As shown in FIG. 5, the framework 25 is comprised of an elongated support channel member having a support bridge portion 27 and opposed leg portions 28. Thus, the elongated channel is a U-shaped member and is also provided with a nesting crosspiece 29 which is disposed in close fit within the elongated cavity 26 and with the bottom leg portions 28' nesting in the side wall cavity portions 26'.

Figure 6:
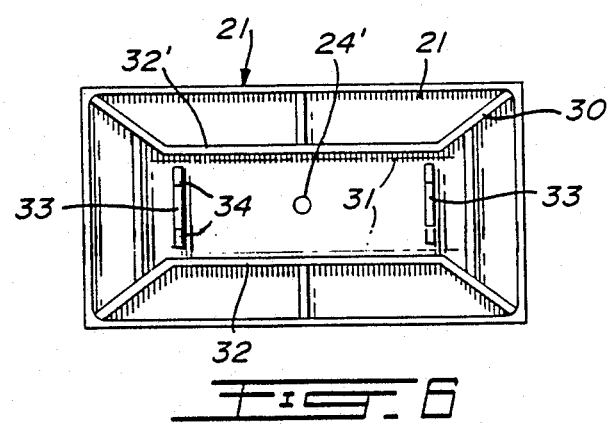
FIG. 6 is a bottom view of the panel constituting the table top.

As seen in FIG. 6, the underface 21' of the panel 21 is provided with reinforcing ribs 30 and arranged to solidify the panel 21. These ribs 30 also define aligning cavities for locating the support bridge portion 27 of the framework 25 at proper locations indicated by broken lines 31 to provide stability to the table top. Such cavity is defined between the ribs 32 and 32' and the ends of transverse ribs 33. Latches 34 may be provided on these ribs 33 to straddle or engage the support bridge 27 to provide for a more stable table top 21, if necessary. However, as herein conceived, the bridge portion 27 is provided in close friction fit between the ends of the transverse ribs 33 and the elongated ribs 32 and 32'. Lock pins may also provide the interlocking.

As shown in FIG. 3, an umbrella 35 may be positioned over the picnic-like table with the umbrella stand 36 extending into the large holes 24 and 24' which are utilized to secure the panel 21 to the top wall 17 of the cover 10.

The cover of the present invention also has many other uses. For example, and with reference to FIG. 1, the holes 18 and 18' may be covered with removable transparent plastic panels 37 to constitute skylights when the panel 21 is removed and the cover is supported at an angle, such as shown by the phantom lines and held there by prop means, such as rods, whereby to constitute a sleeping enclosure. A net (not shown) could then be attached along the lower free edges of the cover 10 whereby the trailer would constitute a tent-like structure.

Referring now additionally to FIGS. 7 and 8, there is shown another conversion of a trailer or panel truck box utilizing the cover 10. As herein shown, connector bars 40 are secured to the side wall 11" of the box trailer 11 and this bar is of substantially L-shaped cross-section and provided with a connecting flange 41 secured to the side wall by means of fasteners 42. The top flange 43 of the connector bar 40 is provided with cavities 44 in which the lower end portion 28' or a lower portion of an extension portion 46 is received to secure the cover 10 elevated from the trailer box 11. Once the lower end of the side arms 28' or the extension piece 46 is received in the cavity 44, it is secured thereto by a screw 45. The extension piece 46 has a spliced top end 47 to secure it to a spliced lower end 48 of the side arm 28'. These structures may be constructed of wood or metal and provide a framework, as shown in FIG. 7, onto which may be permanently or removably secured side panels 50 whereby to convert the trailer into a small dwelling. The side panels 50 could be constructed of clear plastic material, wood panelling, or sheet metal, or any other suitable material. Such may also extend all around the side walls 11' and 11" and the front end wall 11'". This front end wall 11'" could also be constructed with a permanent upper extension wall portion, as shown in FIG. 7.

It is within the ambit of the present invention to cover any other obvious modifications, provided such modifications fall within the scope of the appended claims.

I claim:

1. A convertible cover for an open-top vehicle box, said cover having attachment means for detachably securing same to said box, an integral top wall having at least one opening therein spaced from an edge of said integral top wall to form a seat section on said integral top wall intermediate said opening and an adjacent side edge of said integral top wall, a flat removable panel secured in close fit on said integral top wall and overlying at least said opening and detachable to be supported to constitute a table top and support means for supporting said panel elevated from said integral top wall to constitute said table top, said table top being supported at a predetermined orientation with respect to said opening.

2. A convertible cover as claimed in claim 1 wherein there is provided two of said openings in said integral top wall and opposed to one another with said panel being supported elevated therebetween.

3. A convertible cover as claimed in claim 2 wherein said cover and said integral top wall are rectangular in shape, said integral top wall having a flat upper surface and depending side and end walls.

4. A convertible cover as claimed in claim 3 wherein there is further provided hinge clamp means secured adjacent a lower edge of one of said side walls for engaging a hinge connection secured to a side panel of said vehicle box.

5. A convertible cover as claimed in claim 3 wherein said two openings are rectangular openings disposed across said integral top wall between said side walls and spaced parallel to a respective one of said end walls.

6. A convertible cover as claimed in claim 2 wherein said support means comprises a support framework detachably securable to said integral top wall, said framework supportingly engaging said panel elevated substantially parallel a predetermined distance above said integral top wall.

7. A convertible cover as claimed in claim 6 wherein said framework comprises two elongated support channel members, each channel member having a support bridge portion and opposed legs, said legs being securable adjacent an inner edge of a respective one of said two openings.

8. A convertible cover as claimed in claim 7 wherein each said channel member is an elongated U-shaped member, a nesting cross-piece disposed between said opposed legs and spaced from a free end of said legs parallel to said support bridge portion, and an elongated cavity extending adjacent said inner edge of said openings, said nesting cross-piece being received in close fit in said cavity for maintaining said U-shaped member stationary.

9. A convertible cover as claimed in claim 8 wherein said panel is provided with guide means in an underface thereof for receiving said support bridge portion therein for aligning said panel elevated from said cavity to constitute said table top.

10. A convertible cover as claimed in claim 7 wherein said cover is provided with retaining means on an inside wall and transverse thereof for securing said framework thereto with said opposed legs thereof protruding from a bottom edge of said opposed side walls of said cover, each said legs being positioned a predetermined distance from opposed ends of said side walls, connecting means associated with opposed side panels of said vehicle box for securing said legs thereto to maintain said integral top wall secured at a spaced elevation from said open-top of said vehicle box.

11. A convertible cover as claimed in claim 10 wherein a side panel is secured to said legs intermediate said side panels and said cover side walls.

12. A convertible cover as claimed in claim 11 wherein there is further provided extension pieces securable to said legs and said connecting means for increasing said spaced elevation.

13. A convertible cover as claimed in claim 11 wherein there is further provided a connector bar secured to said box side panels, said connector bar having locking means associated therewith to receive a lower portion of said legs in locking engagement therein.

14. A convertible cover as claimed in claim 2 wherein said vehicle box is a trailer securable to a vehicle.

15. A convertible cover as claimed in claim 2 wherein said vehicle box is a box of a small truck of the pick-up type.

* * * * *